United States Patent
Miyauchi et al.

(10) Patent No.: US 10,052,806 B2
(45) Date of Patent: Aug. 21, 2018

(54) MANUFACTURING APPARATUS AND MANUFACTURING METHOD FOR LIQUID CRYSTALLINE POLYESTER RESIN PELLETS

(71) Applicant: TORAY INDUSTRIES, INC., Tokyo (JP)

(72) Inventors: Kunihiko Miyauchi, Ehime (JP); Toshio Kurematsu, Nagoya (JP); Hiroki Hiraoka, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 204 days.

(21) Appl. No.: 15/129,675

(22) PCT Filed: Mar. 30, 2015

(86) PCT No.: PCT/JP2015/059994
§ 371 (c)(1),
(2) Date: Sep. 27, 2016

(87) PCT Pub. No.: WO2015/152175
PCT Pub. Date: Oct. 8, 2015

(65) Prior Publication Data
US 2017/0144353 A1  May 25, 2017

(30) Foreign Application Priority Data

Mar. 31, 2014 (JP) .................. 2014-072975
Mar. 31, 2014 (JP) .................. 2014-072976

(51) Int. Cl.
*B29B 9/06* (2006.01)
*B29K 67/00* (2006.01)
*B29C 47/00* (2006.01)

(52) U.S. Cl.
CPC ........... *B29C 47/0009* (2013.01); *B29B 9/06* (2013.01); *B29C 47/0004* (2013.01);
(Continued)

(58) Field of Classification Search
None
See application file for complete search history.

(56) References Cited

U.S. PATENT DOCUMENTS

| 5,628,947 A * | 5/1997 | Keilert ............... B29B 9/06 264/143 |
| 2009/0068467 A1 | 3/2009 | Kimura |
| 2015/0004409 A1 | 1/2015 | Sakae et al. |

FOREIGN PATENT DOCUMENTS

| JP | 4-89224 A | 3/1992 |
| JP | 8-192421 A | 7/1996 |

(Continued)

OTHER PUBLICATIONS

International Search Report for PCT/JP2015/059994 (PCT/ISA/210) dated May 12, 2015.
(Continued)

*Primary Examiner* — Mary F Theisen
(74) *Attorney, Agent, or Firm* — Birch, Stewart, Kolasch & Birch, LLP

(57) ABSTRACT

A manufacturing apparatus for liquid crystalline polyester resin pellets that is provided with: a die head with a discharge port for discharging melted liquid crystalline polyester resin supplied to the die head from a reactor through a valve; a cutter for cutting the resin discharged from the die head and solidified; and at least one perforated plate located downstream of the valve and upstream of the discharge port. The hole diameters of a plurality of die holes provided in the discharge port are 3 mm-6 mm and the average hole diameter in the perforated plate is 0.1-1.2 times the hole diameter of the die holes. A manufacturing method (Continued)

for liquid crystalline polyester resin pellets for cutting liquid crystalline polyester resin, which has been discharged from the die head of said apparatus via the discharge port so as to form groups of strands and solidified, into pellet form. Provided is a manufacturing method for liquid crystalline polyester resin pellets, the method having excellent discharge stability and being able to improve productivity of continuous batch polymerization and pellet quality in the step for discharging the melted resin as groups of strands.

11 Claims, 3 Drawing Sheets

(52) U.S. Cl.
CPC ...... *B29C 2793/009* (2013.01); *B29C 2793/0027* (2013.01); *B29K 2067/00* (2013.01); *B29K 2995/0041* (2013.01)

(56) References Cited

FOREIGN PATENT DOCUMENTS

| | | |
|---|---|---|
| JP | 2001-151893 A | 6/2001 |
| JP | 2002-18842 A | 1/2002 |
| JP | 2003-62890 A | 3/2003 |
| JP | 2003-200420 A | 7/2003 |
| JP | 2003-266431 A | 9/2003 |
| JP | 2003-285321 A | 10/2003 |
| JP | 2006-327184 A | 12/2006 |
| JP | 2007-320056 A | 12/2007 |
| JP | 2011-183817 A | 9/2011 |
| JP | 2012-148579 A | 8/2012 |

OTHER PUBLICATIONS

Written Opinion of the International Searching Authority for PCT/JP2015/059994 (PCT/ISA/237) dated May 12, 2015.

* cited by examiner

MANUFACTURING APPARATUS AND MANUFACTURING METHOD FOR LIQUID CRYSTALLINE POLYESTER RESIN PELLETS

TECHNICAL FIELD OF THE INVENTION

Our invention relates to a manufacturing method for liquid crystalline polyester resin pellets, comprising a liquid crystalline polyester resin pellet preparation process to discharge a strand group of melted liquid crystalline polyester resin through a die head and a die at a discharge port (may be simply called "die"), with excellent stability of discharging and improved productivity of continuous batch polymerization and pellet quality. It also relates to a manufacturing apparatus for liquid crystalline polyester resin pellets capable of performing the manufacturing method.

BACKGROUND ART OF THE INVENTION

Liquid crystalline polyester resin has excellent characteristics such as heat resistance, fluidity and electrical characteristic, and is extending its demand mainly on small-sized precision molded products in electric and electronic fields. Its thermal stability and high thermal dimensional precision have been focused and studied on to apply to a supporting base member of heat-generating parts, such as supporting base member of liquid crystal display for Office Automation equipment or cellular phone and lamp components.

To manufacture liquid crystalline polyester resin pellets, a strand group is most generally discharged through a die head having a valve and a discharge port having die holes and is cooled to solidify, and then is cut with a cutter. However, the liquid crystalline polyester resin tends to arrange molecules along the flow direction of melted resin unlike other thermoplastic resins and its melt viscosity may decrease particularly at a low shear rate. Further, its high melting point may require to keep a high temperature of the die head, so that the polymer remaining in the die head is highly crystallized through heat history before being discharged for the next batch or is carbonized to make foreign substance, which might increase to block the die to deteriorate continuous productivity and discharging performance. Furthermore, because the discharged strand group of liquid crystalline polyester resin has a high crystallization rate and cannot be drawn easily, the strand group may meander or flutter. That tendency would become remarkable with many die holes, so that irregular-shaped pellets such as slant pellet, interconnected spherical pellet and uncut pellet is generated to cause a feed rate variation and a blocking at a feeder of extruder or molding machine and feed rate variation.

Patent documents 1 and 2 disclose methods for improving the discharge stability and pellet quality by cutting the strand discharged from the die with a cutter at specific ranges of shear rate, take-up velocity of strand group and average discharge rate of liquid crystalline polyester resin per die hole.

Patent document 3 suggests a method for preparing uniformly-shaped liquid crystalline polyester resin pellets by cooling the strand of liquid crystalline polyester resin discharged from the die below a predetermined temperature.

On the other hand, Patent document 4 suggests a method for preparing uniform polymers by regulating a passing resistance of polymer through a distributor as a general die head for extrusion molding polyester.

PRIOR ART DOCUMENTS

Patent Documents

Patent document 1: JP2003-266431-A (claims)
Patent document 2: JP2002-18842-A (claims)
Patent document 3: JP-H8-192421-A (claims)
Patent document 4: JP-H4-89224-A (claims)

SUMMARY OF THE INVENTION

Problems to be Solved by the Invention

To discharge liquid crystalline polyester resin, it has been general that a polycondensation reactor is pressurized with inert gas or the like while discharge rate and shear rate of the die are adjusted to a target value. Since the methods disclosed in Patent documents 1 and 2 may cause variations in shear rate or discharge rate of liquid crystalline polyester resin discharged from die holes, improvements of strand travelling and pellet shape have been demanded.

Further, since Patent document 3 discloses only one die hole for discharging a strand of liquid crystalline polyester resin to prepare pellets, improvements have been demanded from a viewpoint of productivity.

Furthermore, since Patent document 4 only discloses a device applicable to general polyester such as polyethylene terephthalate and polybutylene terephthalate, the Patent document 4 doesn't disclose how the number and diameter of die holes and hole diameter and position of the distributor should be modified to achieve a good result even for liquid crystalline polyester resin instead.

Accordingly, it could be helpful to provide a manufacturing method for liquid crystalline polyester resin pellets, comprising a liquid crystalline polyester resin pellet preparation process to discharge a strand group of melted liquid crystalline polyester resin through a die head and a die with excellent stability of discharging and improved productivity of continuous batch polymerization and pellet quality. It could also be helpful to provide a manufacturing apparatus for liquid crystalline polyester resin pellets capable of performing the manufacturing method.

Means for Solving the Problems

We have studied the above-described problem to find that the objects such as suppressing high melting point-polymer generation in the die head, blocking the die and improving productivity of continuous batch polymerization can be achieved by a manufacturing apparatus for liquid crystalline polyester resin pellets comprising a die head provided with a discharge port for discharging a melted liquid crystalline polyester resin supplied to the die head from a reactor through a valve and a cutter for cutting the liquid crystalline polyester resin discharged from the die head and solidified, wherein: a filter or a plate having holes (may be collectively called "perforated plate") located downstream of the valve and upstream of the discharge port is provided; the discharge port has a plurality of die holes of which diameters are predetermined; and the perforated plate has an average hole diameter of predetermined times as large as the diameter of the die holes. It is also found that the discharge performance and pellet quality can be improved.

Our manufacturing apparatus for liquid crystalline polyester resin pellets comprises a die head provided with a discharge port for discharging a melted liquid crystalline polyester resin supplied to the die head from a reactor through a valve, a cutter for cutting the liquid crystalline polyester resin discharged from the die head and solidified, and at least one perforated plate located downstream of the valve and upstream of the discharge port, characterized in that the discharge port has a plurality of die holes of which diameters are 3 mm to 6 mm and the perforated plate has an average hole diameter of 0.1 to 1.2 times the diameter of the die holes.

Also, our manufacturing method of liquid crystalline polyester resin pellets comprises: supplying a melted liquid crystalline polyester resin through a valve from a reactor to a die head; preparing pellets by cutting a strand group of the liquid crystalline polyester resin solidified and discharged through a discharge port from the die head; and using our manufacturing apparatus for the liquid crystalline polyester resin pellets.

Effect According to the Invention

With our inventions of manufacturing apparatus for liquid crystalline polyester resin pellets and manufacturing method for liquid crystalline polyester resin pellets, the objects such as suppressing high melting point-polymer generation in the die head, blocking the die and improving productivity of continuous batch polymerization can be achieved through a process of manufacturing liquid crystalline polyester resin pellets. Further, the discharge performance and pellet quality can be improved.

EMBODIMENTS FOR CARRYING OUT THE INVENTION

Figure 1:
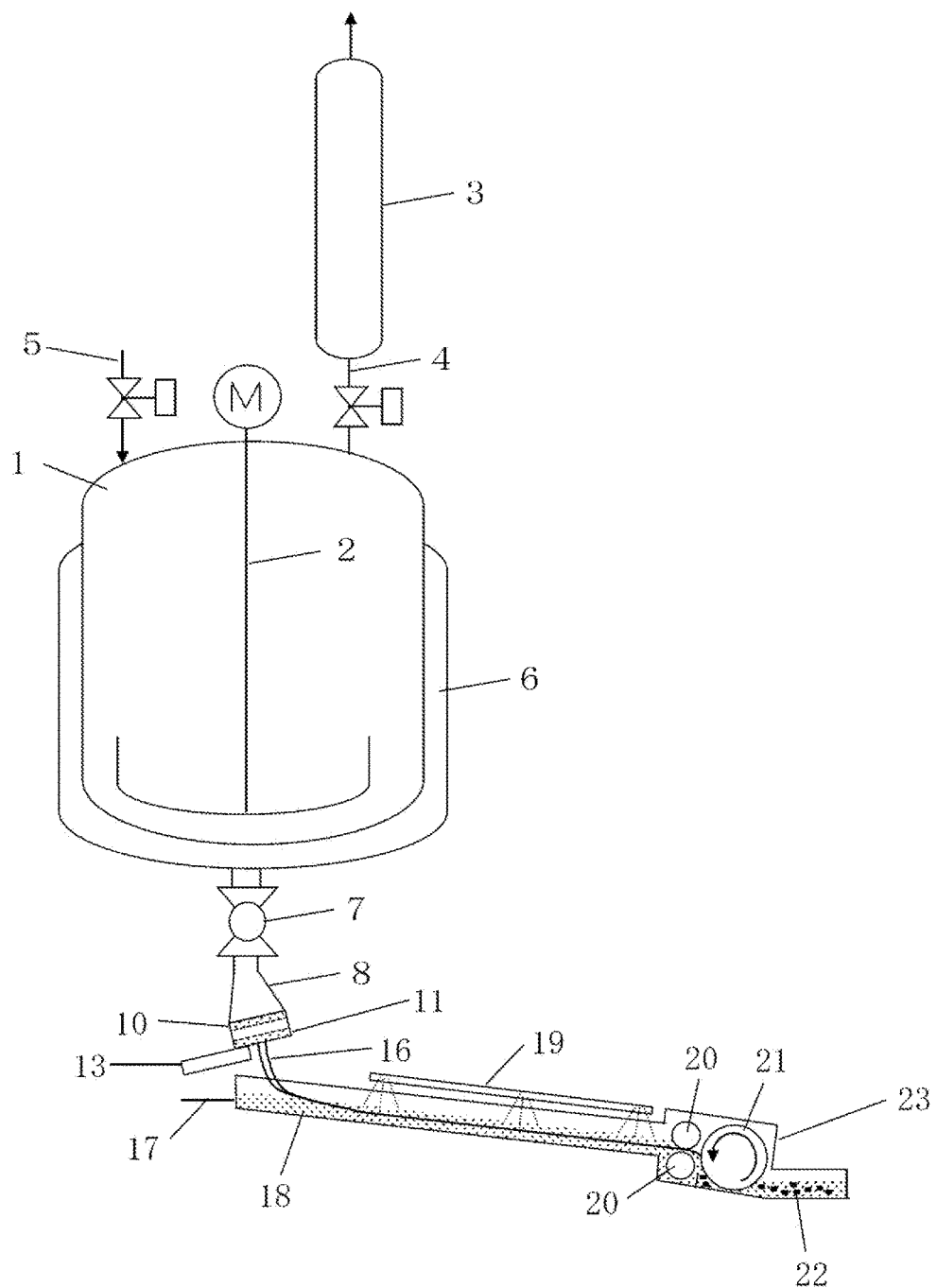
FIG. 1 is a schematic overall view showing an example of liquid crystal polyester resin pellet manufacturing apparatus having a die head connected with a valve.

In the specification, a liquid crystalline polyester resin means a liquid crystalline polyester resin capable of forming an anisotropy melt phase, which may be liquid crystalline polyester or liquid crystalline polyester amide having an ester bond.

It is preferable that a structural unit constituting the liquid crystalline polyester resin is selected from a group of aromatic oxycarbonyl unit, aromatic and/or an aliphatic dioxy unit and aromatic and/or aliphatic dicarbonyl unit.

The aromatic oxycarbonyl unit may be a structural unit generated from p-hydroxybenzoic acid, 6-hydroxy-2-naphthoic acid or the like, preferably p-hydroxybenzoic acid. The aromatic or aliphatic dioxy unit may be a structural unit generated from 4,4'-dihydroxybiphenyl, hydroquinone, 3,3', 5,5'-tetramethyl-4,4'-dihydroxybiphenyl, t-butylhydroquinone, phenyl hydroquinone, 2,6-dihydroxynaphthalene, 2,7-dihydroxynaphthalene, 2,2-bis(4-hydroxyphenyl) propane and 4,4'-dihydroxydiphenyl ether, ethylene glycol, 1,3-propylene glycol, 1,4-butanediol or the like, preferably 4,4'-dihydroxybiphenyl or hydroquinone. The aromatic or aliphatic dicarbonyl unit may be a structural unit generated from terephthalic acid, isophthalic acid, 2,6-naphthalenedicarboxylic acid, 4,4'-diphenyl dicarboxylic acid, 1,2-bis (phenoxy) ethane-4,4'-dicarboxylic acid, 1,2-bis(2-chlorophenoxy) ethane-4,4'-dicarboxylic acid, 4,4'-diphenyl ether dicarboxylic acid, adipic acid, sebacic acid or the like, preferably terephthalic acid or isophthalic acid.

The liquid crystalline polyester resin may comprise: a structural unit generated from p-hydroxybenzoic acid, a structural unit generated from 4,4'-dihydroxy biphenyl, a structural unit generated from hydroquinone and a structural unit generated from terephthalic acid and/or isophthalic acid; a structural unit generated from p-hydroxybenzoic acid, a structural unit generated from ethylene glycol, a structural unit generated from 4,4'-dihydroxybiphenyl, a structural unit generated from hydroquinone and a structural unit generated from terephthalic acid and/or isophthalic acid; a structural unit generated from p-hydroxybenzoic acid, a structural unit generated from ethylene glycol, a structural unit generated from 4,4'-dihydroxybiphenyl and a structural unit generated from terephthalic acid and/or isophthalic acid; or a structural unit generated from p-hydroxybenzoic acid, a structural unit generated from hydroquinone, a structural unit generated from 4,4'-dihydroxybiphenyl, a structural unit generated from 2,6-naphthalenedicarboxylic acid and a structural unit generated from terephthalic acid. Above all, it is preferable that the liquid crystalline polyester resin comprises: a structural unit generated from p-hydroxybenzoic acid, a structural unit generated from hydroquinone, a structural unit generated from 4,4'-dihydroxybiphenyl and a structural unit generated from terephthalic acid and/or isophthalic acid; or a structural unit generated from p-hydroxybenzoic acid, a structural unit generated from ethylene glycol, a structural unit generated from 4,4'-dihydroxybiphenyl and a structural unit generated from terephthalic acid and/or isophthalic acid.

It is preferable that the liquid crystalline polyester resin capable of forming an anisotropy melt phase comprises the following structural units (I), (II), (III), (IV) and (V).

[Chemical formula 1]

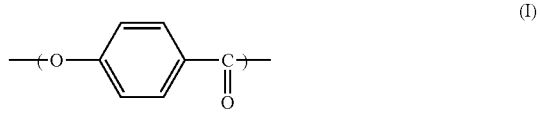

(I)

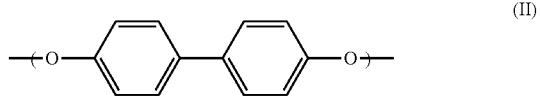

(II)

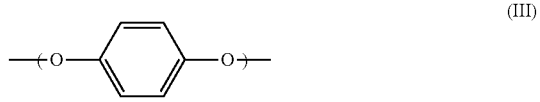

(III)

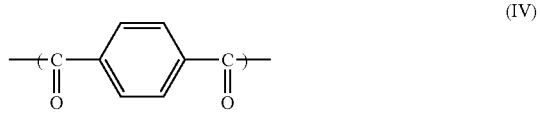

(IV)

(V)

Structural unit (I) is generated from p-hydroxybenzoic acid. Structural unit (II) is generated from 4,4'-dihydroxybiphenyl. Structural unit (III) is generated from hydroquinone. Structural unit (IV) is generated from terephthalic acid. Structural unit (V) is generated from isophthalic acid.

Hereinafter, this kind of liquid crystalline polyester resin will be explained.

Structural units (I), (II), (III), (IV) and (V) can be copolymerized by an arbitrary proportion. To optimize characteristics of liquid crystalline polyester resin, it is preferable that they are copolymerized by the following proportion. It is preferable that a proportion of structural unit (I) is 65 to 80 mol % relative to the total of structural units (I), (II) and (III). It is more preferably 68 to 78 mol %. It is preferable that a proportion of structural unit (II) is 55 to 85 mol % relative to the total of structural units (II) and (III). it is more preferably 55 to 78 mol % and is most preferably 58 to 73 mol %. It is preferable that a proportion of structural unit (IV) is 50 to 95 mol % relative to the total of structural units (IV) and (V). It is more preferably 55 to 90 mol % and is most preferably 60 to 85 mol %.

The total of structural units (II) and (III) should be substantively equimolar to the total of structural units (IV) and (V). The phrase "substantively equimolar" means that structural units constituting the polymer main chain except for terminals are equimolar to each other. Accordingly, it is possible that they are "substantively equimolar" to each other even in an embodiment where they would not be equimolar if structural units including the one constituting terminals are counted in.

Above all, it is preferable that the liquid crystalline polyester resin has structural unit (I) of 30 mol % or more in the total of five structural units. The liquid crystalline polyester resin having the structural unit of 30 mol % or more can desirably achieve a target heat resistance.

In addition to the components constituting structural units (I)-(V), the liquid crystalline polyester resin may further comprise: an aromatic dicarboxylic acid compound such as 3,3'-diphenyl dicarboxylic acid and 2,2'-diphenyl dicarboxylic acid; an aliphatic dicarboxylic acid compound such as adipic acid, azelaic acid, sebacic acid and dodecanedioic acid; a cycloaliphatic dicarboxylic acid compound such as hexahydroterephthalic acid; an aromatic diol compound such as chlorohydroquinone, 3,4'-dihydroxybiphenyl, 4,4'-dihydroxydiphenyl sulfone, 4,4'-dihydroxydiphenyl sulfide, 4,4'-dihydroxybenzophenone and 3,4'-dihydroxy biphenyl; an aliphatic diol compound such as propylene glycol, 1,4-butanediol, 1,6-hexanediol and neopentylglycol; an alicyclic diol compound such as 1,4-cyclohexanediol and 1,4-cyclohexanedimethanol; m-hydroxy benzoic acid; polyethylene terephthalate; or the like to the extent that the liquid crystallinity and characteristics are not spoiled.

The liquid crystalline polyester resin may be made from aromatic hydroxycarboxylic acid compound, diol compound, dicarboxylic acid compound or amino group-containing monomer.

Above all, it is preferable that it is made from the aromatic hydroxycarboxylic acid compound such as p-hydroxybenzoic acid, the diol compound such as 4,4'-dihydroxybiphenyl, hydroquinone and ethylene glycol, or the aromatic dicarboxylic acid compound such as terephthalic acid and isophthalic acid.

The following monomers may be used, other than hydroquinone, ethylene glycol, p-hydroxybenzoic acid, 4,4'-dihydroxybiphenyl, terephthalic acid and isophthalic acid. The aromatic hydroxycarboxylic acid compound may be 6-hydroxy-2-naphthoic acid. The aromatic dicarboxylic acid compound may be 2,6-naphthalenedicarboxylic acid, 4,4'-diphenyl dicarboxylic acid, 1,2-bis(phenoxy) ethane-4,4'-dicarboxylic acid, 1,2-bis(2-chlorophenoxy) ethane-4,4'-dicarboxylic acid, 4,4'-diphenyl ether dicarboxylic acid or the like. The aromatic diol compound may be resorcinol, t-butylhydroquinone, phenyl hydroquinone, chlorohydroquinone, 2,6-dihydroxynaphthalene, 2,7-dihydroxynaphthalene, 3,4'-dihydroxybiphenyl, 2,2-bis(4-hydroxyphenyl) propane, 4,4'-dihydroxydiphenyl ether or the like. The amino group-containing monomer may be p-aminobenzoic acid, p-aminophenol or the like.

It is preferable that the liquid crystalline polyester resin is prepared by the following manufacturing method. The following method is explained with an example of synthesizing liquid crystalline polyester resin comprising p-hydroxybenzoic acid, 4,4'-dihydroxybiphenyl, hydroquinone, terephthalic acid and isophthalic acid although the following method may be modified with another copolymerization composition including polyethylene terephthalate, another hydroxycarboxylic acid compound, aromatic diol compound or aromatic dicarboxylic acid compound in preparing it.

The content of each structural unit in liquid crystalline polyester resin can be calculated by the following processing. The liquid crystalline polyester is sampled with a test tube for NMR (Nuclear Magnetic Resonance) to dissolve in a solvent (e.g. mixed solvent of pentafluorophenol/deuterated tetrachloro ethane-$d_2$) capable of dissolving liquid crystalline polyester to perform $^1$H-NMR spectrum measurement. The content of each structural unit can be calculated from a peak area ratio derived from each structural unit.

Hereinafter, a manufacturing method of liquid crystalline polyester resin pellet will be explained in details.

For example, predetermined amounts of monomer mixture and acetic anhydride are stirred and heated in nitrogen atmosphere to acetylate hydroxyl group while refluxing in a reactor comprising a raw material inlet, stirring blade, a rectifying pipe, a distillation pipe, a decompresser and a discharge port at the bottom. Then acetic acid is distilled through the distillation pipe from the reactor by heating it to a predetermined temperature. When a predetermined amount of acetic acid is distilled, the reactor is decompressed to distillate the acetic acid generated by polycondensation reaction. When the stirring torque reaches a predetermined level after distilling acetic acid, the deacetylation polycondensation is finished. When the deacetylation polycondensation is finished, the stirring is stopped and the reactor is pressurized with nitrogen to discharge a strand of polymer to be pelletized with a cutting apparatus through a die from the discharge port at the bottom of the reactor.

The number of reactors is not particularly limited in the present invention, which can be performed with one reactor or two or more reactors. The following example is desirable for two tanks. First, the acetylation is performed with monomer material and acetic anhydride in reactor 1 and then the deacetylation polycondensation is performed up to a predetermined temperature and a predetermined distillation amount of acetic acid. Next, reaction liquid is transferred from reactor 1 to reactor 2 through a transferring pipe and the deacetylation polycondensation is further performed up to a predetermined temperature and a predetermined distillation amount of acetic acid. Then reactor 2 is decompressed to further perform the polycondensation, which is finished when the stirring torque reaches a predetermined level. In the specification, the final reactor provided with a discharge port to discharge it from the reactor or reactors is called a polycondensation reactor.

It is preferable that the acetic anhydride is mixed by 1.00 to 1.20 molar equivalents relative to the total amount of phenolic hydroxyl group of liquid crystalline polyester resin raw material. It is more preferably 1.03 to 1.16 molar equivalents. It is preferable that the acetylation is continued as refluxing at 125° C. to 150° C. until residual monoacetylated aromatic diol becomes a predetermined level.

Conventionally, the monomers have generally been mixed to make total mol of terephthalic acid and isophthalic acid equal to total mol of 4,4'-dihydroxybiphenyl and hydroquinone. It is preferable that the hydroquinone is added by an amount of 2 to 15 mol % excessive to the conventionally general mol because hydroquinone tends to sublimate. With such a configuration, quantity of monomer of the short hydroquinone by sublimation of the hydroquinone is to achieve a target polymerization rate, so that the gas increase can be suppressed when the polymer stays during heating.

The acetylation can be performed with a reactor provided with a reflux pipe, a rectifying column and a condenser. The acetylation should be performed for roughly 1 to 5 hours, although the time until residual monoacetylated aromatic diol becomes a predetermined level depends on reaction temperature and the liquid crystalline polyester resin raw material. It is preferable that the acetylation is performed for 1.0 to 2.5 hours because it takes only a short time at a high reaction temperature and a great molar ratio of acetic anhydride to phenolic hydroxyl group terminal.

It is preferable that the acetic acid is distilled by heating it to a predetermined temperature while a head temperature of the rectifying column is 115° C. to 150° C. It is more preferable that the temperature is 130° C. to 145° C. The head temperature below the preferable range might have much unreacted acetic anhydride remained in the system to cause a coloring on the polymer or increased gas staying during heating. The head temperature above 150° C. might have a distillation of monomers out of the system to cause a missed composition or lowered polymerization rate. It is preferable that the distilled acetic acid containing excessive acetic anhydride and monomers contains 1 mass % or less, preferably 0.5 mass % or less, of monomers other than acetic acid and acetic anhydride.

It is preferable that the deacetylation polycondensation is performed by a melt polymerization method in which the polymerization is finished by decompressing at a temperature at which liquid crystalline polyester resin melts. The melt polymerization method is advantageous for preparing homogeneous polymer with less gas generation.

It is preferable that the final polymerization temperature is around the melting point+20° C., preferably 370° C. or less. The polymerization should ordinarily be performed at a decompression degree of 13.3 Pa (0.1 torr) to 2,666 Pa (20 torr), preferably 1,333 Pa (10 torr) or less, further preferably 667 Pa (5 torr) or less. It is preferable that the polymerization is performed at a polymerization rate of 0.5 to 1 hour in terms of polymerization time from when the decompression degree becomes below 667 Pa to when the polymerization stirring torque reaches a predetermined level to finish the polymerization.

Although the polycondensation of liquid crystalline polyester resin can progress without catalyst, a metal compound catalyst such as stannous acetate, tetrabutyl titanate, potassium acetate, sodium acetate, antimony trioxide and metal magnesium may be used.

Our manufacturing method of liquid crystalline polyester resin pellets comprises: supplying a melted liquid crystalline polyester resin through a valve from a reactor to a die head; preparing pellets by cutting a strand group of the liquid crystalline polyester resin solidified and discharged through a discharge port from the die head; and using a manufacturing apparatus for the liquid crystalline polyester resin pellets comprising: the die head provided with the discharge port for discharging the melted liquid crystalline polyester resin supplied to the die head from the reactor through the valve; a cutter for cutting the liquid crystalline polyester resin discharged from the die head and solidified; and at least one perforated plate located downstream of the valve and upstream of the discharge port, the discharge port having a plurality of die holes of which diameters are 3 mm to 6 mm, the perforated plate having an average hole diameter of 0.1 to 1.2 times the diameter of the die holes.

Figure 2:
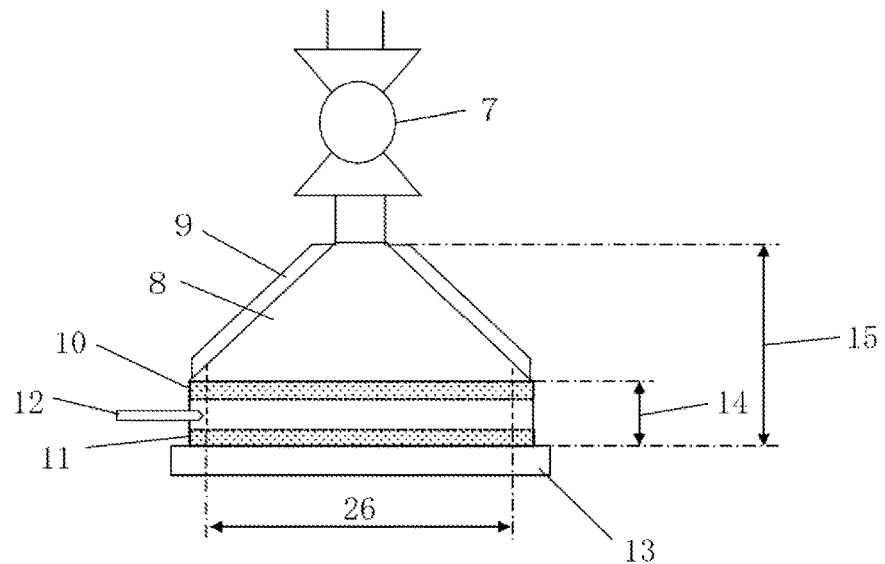
FIG. 2 is a schematic front view showing the die head in FIG. 1.
Figure 3:
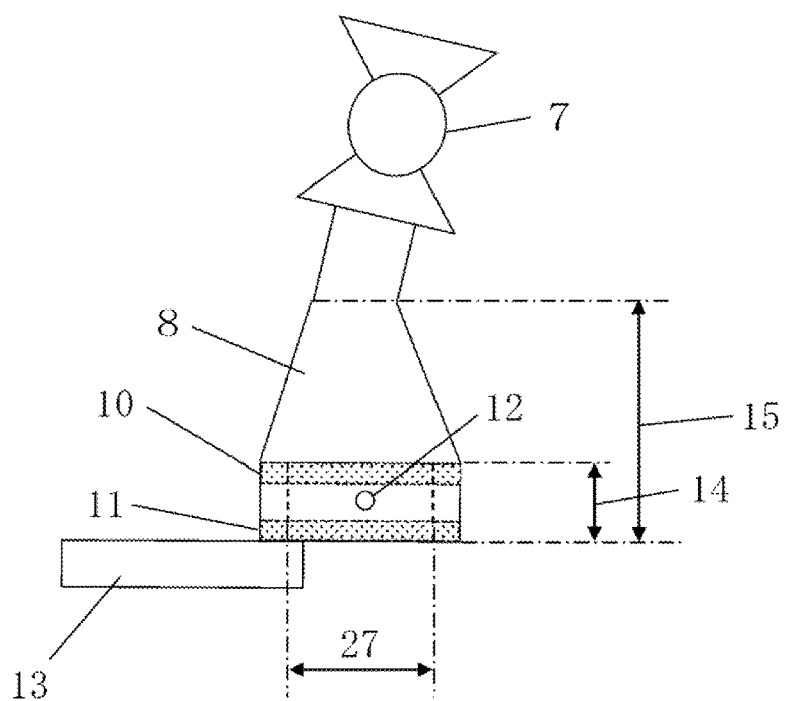
FIG. 3 is a schematic side view showing the die head in FIG. 1.

As shown in FIGS. 1-3, melted liquid crystalline polyester resin after polycondensation finished in polycondensation reactor 1 is supplied to die head 8 with discharge valve 7 open and is discharged as strand group 16 through perforated plate 10 and discharge port plate 11 having die holes. After strand group 16 is discharged into trough 18 where a coolant flows, it is solidified by cooling with the coolant supplied through cutter coolant supply line 17. It is conveyed to cutter part 23 consisting of strand group take-up roll 20 and strand group cutting rotary blade 21 and is taken up with strand group take-up roll 20, and then is cut with strand group cutting rotary blade 21 in water to prepare liquid crystalline polyester resin pellet 22. The obtained liquid crystalline polyester resin pellet 22 is subject to a water draining process to remove water and is transferred to a pellet receiver tank or the like to be stored. To cool the conveyed strand group and maintain the travelling stability, it is possible that strand group cooling spray 19 is provided at a position above trough 18 or where the strand group falls.

Our manufacturing apparatus has at least one valve between polycondensation reactor 1 and die head 8 or at a position above die head 8. It is preferable that it has only one valve from viewpoints of cost and maintenance. It is preferable that the valve is a ball valve or a push-in valve, preferably the push-in valve with a good polymer-sealing performance and a good operation.

Figure 4:
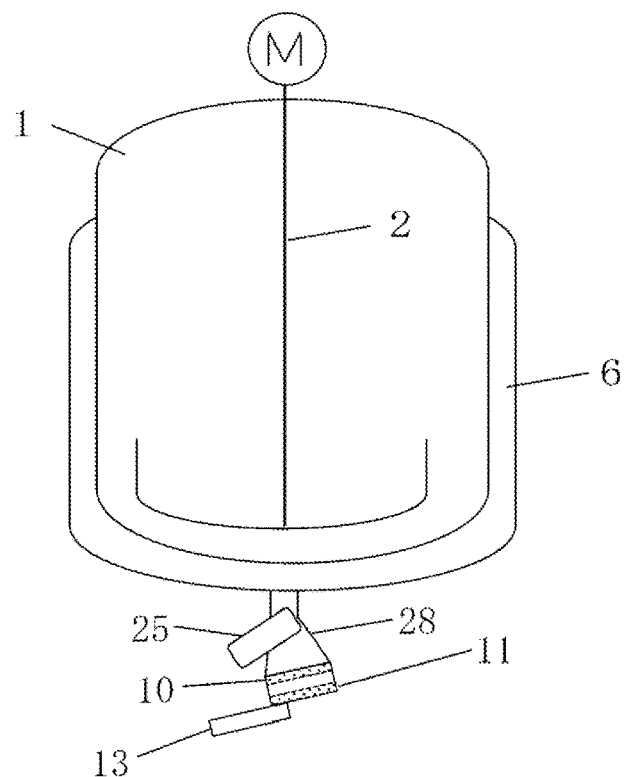
FIG. 4 is a schematic overall view showing an example of liquid crystal polyester resin pellet manufacturing apparatus having a die head with a built-in discharge valve.
Figure 5:
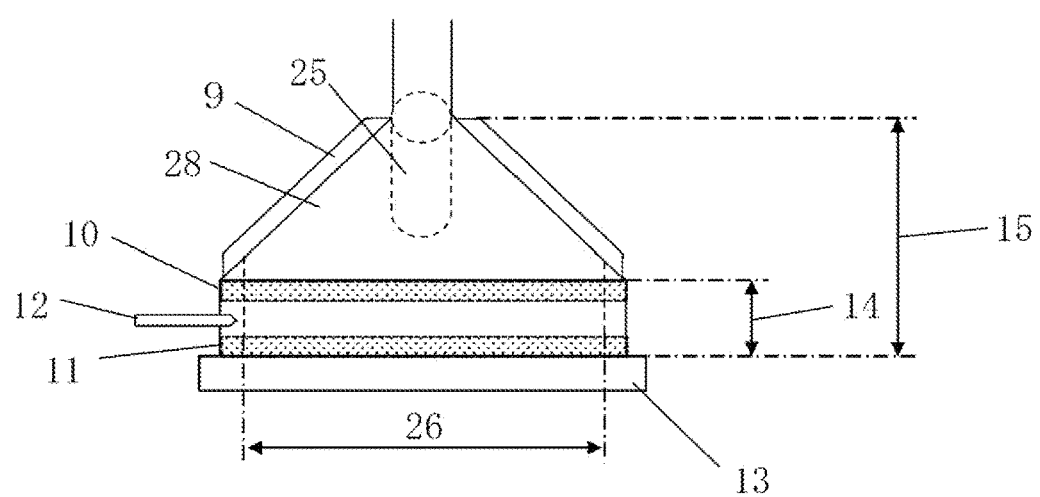
FIG. 5 is a schematic front view showing the die head in FIG. 4.

Die head 8 is located at the bottom of polycondensation reactor 1 and is connected through discharge valve 7 to polycondensation reactor 1 in FIGS. 1-3 while die head 28 having built-in discharge valve 25 is connected directly to the bottom of polycondensation reactor 1 as shown in FIGS. 4-5.

Die head 8 may have a heating unit for heating polymer flowing or staying inside at any position. It is possible that the heating unit is attached to an inner wall surface of die head 8 or buried inside a wall of die head 8. It is also possible that it is attached to an outer wall surface of the die head so that the inner wall surface is heated through the wall of die head 8. Alternatively, discharge valve 7 may be heated. The heating unit may be a coil, jacket or belt-shaped heat generator to cover the die head to be heated. Above all, it is preferable that jacket 9 is attached to the outer wall surface from a viewpoint of uniform heating temperature. The heating unit may contain heat medium liquid or its vapor circulating in the coil or jacket 9. Alternatively, the heating unit has an electrically-heated wire. It is preferable that it contains heat medium liquid or its vapor circulating, and it is more preferable that the heat medium liquid is circulated with a pump in jacket 9 so that the temperature can be controlled stably.

Die head 8 is provided with discharge port plate 11. It is preferable that a shut-off valve is provided below discharge port plate 11 to enclose residual polymer and keep the die holes warm. Although the shape of shut-off valve is not particularly limited and a generally available valve has no problem, slit valve, ball valve and slide plate valve 13 can be exemplified. In this case, it is possible that the die holes are covered by crimping with a valve plate or the like until the next batch and the valve plate or the like is removed at the time of discharge so that the valve plate or the like functions as a shut-off valve. It is preferable that such a shut-off valve is a slit valve or slide plate valve 13 for its excellent operation and maintenance.

It is preferable that die head 8 has a shape in which a ratio (H2/W) of a height (H2) and a width (W) of a bottom is 0.10 to 0.50 where the height is of a part getting wider toward the discharge port in a flow direction of liquid crystalline polyester resin. It is more preferably 0.15 to 0.40. The ratio of 0.1 or more can achieve a stable discharge because strands discharged from the die have uniform shear rate. The ratio of 0.50 or less can achieve a good shape of pellets because residual polymer doesn't tend to stay inside the die head which has not so large volume to make the strand thickness uniform.

It is preferable that die head 8 has a shape in which a ratio (D/W) of a depth (D) of a bottom to a width (W) of the bottom of die head 8 is 0.03 to 0.5. It is more preferably 0.05 to 0.35. The ratio of 0.03 or more can reduce fusion-bonding between strands to make the pellet shape uniform. The ratio of 0.5 or less can prevent from generating high melting point-foreign substances because residual polymer doesn't tend to stay inside the die head which has not so large volume. It can also achieve a good shape of pellets because the strand thickness is made uniform.

Besides, depth (D) and width (W) of the bottom of die head 8 represents inner diameters of die head 8 contacting the die. The product of depth (D) and width (W) of the bottom represents a cross section area of a part where polymers stay. Here, width (W) is defined as the longer side of the bottom of die head 8 while depth (D) is defined as the shorter side thereof.

At least one perforated plate 10 should be provided between discharge valve 7 and the discharge port. Perforated plate 10 may be a woven wire made of lattice of stainless steel wire or a plate having holes, or alternatively, may be a plate having the woven wire fixed on the plate having holes. Without the perforated plate, there might be caused the following troubles. Residual polymer might tend to stay in a part of inside. Foreign substances of carbide or the like might block the die of the discharge port to increase the pressure loss and fail to achieve a target discharge time, so that the die has to be replaced. Thread-like strand might be taken on the cutter or roller to cause a trouble in discharging.

It is preferable that one or two perforated plates are provided from viewpoints of production cost and maintenance although more than one perforated plate can be provided. When two plates are provided, it is preferable that a woven wire filter is provided above another plate.

The filter mesh size or plate hole diameter should be 0.1 to 1.2 times the die hole diameter of discharge port. It is preferably 0.5 to 1.0 times it. The mesh size or hole diameter of less than 0.1 times might have a great pressure loss and fail to achieve a target discharge time and to substitute residual polymer in the die head, even though capable of capturing foreign substances. The mesh size or hole diameter of more than 1.2 times might cause the following troubles. Foreign substances might not be captured effectively, so that the foreign substances might contaminate products or the die might have to be replaced because of blocked die hole of the discharge port. Thread-like strand might be taken on the cutter or roller to cause a trouble in discharging. The filter mesh size or plate hole diameter is defined as average value among randomly selected 20 values of hole diameters. When there are less than 20 values in total, it is defined as average value of all hole diameters. When a plurality of filters or plates are combined to make the perforated plate, the average value is calculated with each smallest value of mesh size or hole diameter.

It is preferable that the filter mesh openings or plate holes are provided on almost a whole surface. The mesh openings or holes provided on almost a whole surface can allow polymers to uniformly pass through with less amount of residual polymer staying. It is preferable that the filter mesh openings or plate holes are equally spaced. When the plate holes are disposed in two or more lines, zigzag or honeycomb layout is preferable. The zigzag or honeycomb layout is advantageous to design many holes, so that residual polymer staying inside can be decreased and pressure loss can be reduced at the plate.

It is possible that the layout of holes of the perforated plate is the same as or different from the layout of die holes of discharge port. It is sufficient that each layout is equally spaced to the extent that the polymer flow is not spoiled.

It is preferable that a ratio (H1/H2) of height (H1) to height (H2) of the die head is 0.2 to 0.6, preferably 0.3 to 0.5, where the height (H1) is a distance between the uppermost perforated plate and the discharge port. The ratio of 0.2 or more can prevent residual polymer from staying inside the die head which has not so large volume so as not to make a thin strand near both ends of die, not to make a variation of pellet shapes, and not to cause a blocking of die holes. The ratio of 0.6 or less can prevent residual polymer from accumulating between the perforated plate and the die so as not to cause a blocking of die holes, so that each strand discharged from the die can have uniform shear rate so as not to have uneven strand thicknesses, vertical fluttering and flow failure of strand group. Thus, a stable discharge can be performed.

The discharge port should have a die hole diameter of 3 mm to 6 mm. It is preferable that the die hole diameter is 3.5 mm to 6.0 mm, preferably 4.0 mm to 5.5 mm. The die hole diameter of less than 3 mm might have such a great pressure loss at the die that higher discharge pressure is required, so that desirable pellets cannot be prepared with thin, bending or meandering strands. The die hole diameter of more than 6 mm might have a thick rigid strand group to cause vertical fluttering and flow failure of strand group as well as many irregular-shaped pellets such as interconnected spherical pellet and uncut pellet.

It is preferable that the discharge port has die holes of 20 or more, preferably 40 or more. To prepare pellets having an excellent shape, it is necessary that most of residual polymers don't stay in the die head and a whole strand group travels stably. Such many die holes, corresponding to many strand groups, can contribute to preparing liquid crystalline polyester resin pellets stably.

It is preferable that the discharge port has a die hole layout in which strand groups wouldn't overlap to each other when the strand groups are taken up. It is possible that the layout is such that the die holes are aligned laterally or zigzag. It is preferable that the die holes are aligned zigzag so that strand groups don't tend to overlap to each other and a target number of die holes can be laid out. It is further preferable that the die holes are provided near both ends of die head, so that residual polymer doesn't tend to stay at the both ends of die head.

It is preferable that the die head has a shear rate of the liquid crystalline polyester resin per die hole of the discharge port of 150 [1/sec] to 3,000 [1/sec], preferably 250 [1/sec] to 2,000 [1/sec].

The shear rate of 150 [1/sec] or more can prevent the strand group from traveling badly in a low shear rate region right after discharge start. The shear rate of 3,000 [1/sec] or less can sufficiently substitute the residual polymer in the die head so as not to make foreign substances having a high-melting point. Further, the strand group can be taken up stably to prepare a uniform pellet shape desirably.

The "shear rate" of liquid crystalline polyester resin means a value calculated per die hole of discharge port by the following formula (1).

Shear rate [1/sec] of resin=80,000/9×Discharge rate [kg/hr]/{Resin density [g/cm³]×Die hole number [unit]×π (pi)×Die hole diameter [mm]³}   Formula (1):

It is preferable that the liquid crystalline polyester resin has a melt viscosity ($\mu$a200) and a melt viscosity ($\mu$a5000) both of 1.5 or more, preferably 2.0 or more, where the melt viscosity ($\mu$a200) and the melt viscosity ($\mu$a5000) respectively correspond to shear rate of 200 [1/sec] and 5,000 [1/sec] of the liquid crystalline polyester resin discharged from die holes of the discharge port of die head at a discharge temperature. It is preferable that the melt viscosities are 10.0 or less, preferably 7.0 or less. It is preferable that the following formula (2) is satisfied. It is more preferable that the following formula (3) is satisfied. The value of ($\mu$a200)/($\mu$a5000) of 1.5 or more can make a little difference of the shear rates between the center and both ends, so that strands have the same thickness to prepare pellets with a stable shape while the strands hardly have breakage because of a moderate stiffness. The value of ($\mu$a200)/($\mu$a5000) of 10.0 or less can prevent a strand group from travelling badly because the strand elongates not to become thick at a low shear rate region right after discharge start while residual polymer in the die head becomes easily substituted. A Koka-type flow tester may be employed to measure a melt viscosity at shear rate of 200 [1/sec] and a melt viscosity at shear rate of 5,000 [1/sec].

1.5<($\mu$a200)/($\mu$a5000)<10.0   Formula (2):

2.0<($\mu$a200)/($\mu$a5000)<7.0   Formula (3):

To take the melted resin out of a reactor after finishing polycondensation reaction, it is possible that inside of the reactor is pressurized to 0.02-0.5 MPa to discharge a strand of the melted resin from a discharge port of die head connected to the bottom of a polycondensation reactor at a temperature at which liquid crystalline polyester resin melts. It is preferable that the strand group is discharged into a trough where coolant flows and is solidified with the coolant to prepare liquid crystalline polyester resin pellets cut with a cutter. The discharged strand may be half-melted inside. It is sufficient that the strand is solidified to the extent that the pellets prepared with a cutter neither fusion bond to each other nor have whisker-shaped protrusions. The cutter may be installed to incline vertically or horizontally from the trough surface. The inclined angle can be designed according to viscosity of discharged liquid crystalline polyester resin or installation space. To prevent the strand group from fluttering and meandering, it is preferable that the take-up velocity is 20 to 100 m/min, preferably 30 to 80 m/min. The take-up velocity of strand group means a rotation speed of a cutter in a case where the strand group is taken up directly with the cutter. In another case that the strand group is once taken up with a take-up roller or the like and then is cut with a cutter, the take-up velocity means a rotation speed of the take-up roller of strand group.

It is possible that the polycondensation reaction is finished by a solid-phase polymerization method to manufacture the liquid crystalline polyester resin. For example, polymer or oligomer of the liquid crystalline polyester resin is crushed with a crusher and is heated for 1 to 50 hours at a temperature between the melting point of liquid crystalline polyester resin—50 [° C.] and the melting point—5 [° C.] under nitrogen gas flow or reduced pressure to proceed with the polycondensation to a desired polymerization degree by finishing the reaction. The solid-phase polymerization method is an advantageous method to manufacture a polymer having a high degree of polymerization.

It is preferable that the liquid crystalline polyester resin pellet has a melt viscosity of 10 to 500 Pa·s, preferably 12 to 200 Pa·s. The melt viscosity means a value determined with a Koka-type flow tester under a condition of temperature between the melting point (Tm)+10 [° C.] and the melting point (Tm)+20 [° C.] at shear rate of 1,000 [1/sec].

For a use requiring a high heat resistance, it is preferable that the copolymerization components are designed to have a melting point of 280° C. or more, although the melting point of the liquid crystalline polyester resin is not limited in particular.

To give a physical property such as mechanical strength, the liquid crystalline polyester resin may contain a filler. The filler may be fibrous, plate-like, powdery and granular. Specifically, it may be a fibrous or whisker-like filler made of glass fiber, PAN-based or pitch-based carbon fiber, stainless steel fiber, metal fiber such as aluminum fiber and brass fiber, organic fiber such as aromatic polyamide fiber and liquid crystalline polyester fiber, gypsum fiber, ceramic fiber, asbestos fiber, zirconia fiber, alumina fiber, silica fiber, titanium oxide fiber, silicon carbide fiber, rock wool, basalt fiber, titanium oxide whisker, potassium titanate whisker, barium titanate whisker, aluminum borate whisker and silicon nitride whisker. Alternatively, it may be a powdery, granular or plate-like filler made of mica, talc, kaolin, silica, glass bead, glass flake, glass micro balloon, clay, molybdenum disulfide, wollastonite, titanium oxide, zinc oxide, calcium polyphosphate or graphite. The surface of the above-described filler may be finished with a known coupling agent such as silane-based coupling agent and titanate-based coupling agent or another surface-treatment agent.

It is preferable that the filler is a glass fiber, from a viewpoint of availability and mechanical strength balance. The glass fiber should be the one used for reinforcing resin, and may be a long fiber type or chopped strand or milled fiber of short fiber type. It is possible to use two or more kinds of these glass fibers. It is preferable that the glass fiber is alkalescent because of its mechanical strength. It is also preferable that the glass fiber is treated with an epoxy-based, urethane-based or acryl-based agent for covering or sizing. It is particularly preferable that the glass fiber is treated with an epoxy-based agent. It is also preferable that the glass fiber is treated with a silane-based or titanate-based coupling agent or another surface-treatment agent, preferably with an epoxy silane-based or amino silane-based coupling agent.

It is possible that the glass fiber is covered or sized with a thermoplastic resin such as ethylene/vinyl acetate copolymer or a thermosetting resin such as epoxy resin.

The filler should be contained by 30 to 200 parts by weight, preferably 40 to 150 parts by weight, relative to 100 parts by weight of liquid crystalline polyester resin.

To give a desirable characteristic, the liquid crystalline polyester resin may contain antioxidant, heat stabilizer such as hindered phenol, hydroquinone, phosphite and these substitutes, ultraviolet absorber such as resorcinol and salicylate, coloration inhibitor such as phosphite and hypophosphite, lubricant, release agent such as montanoic acid, its metal salt, its ester, its half ester, stearyl alcohol, stearamid and polyethylene wax, coloring agent including dye and pigment, carbon black as a conductive agent or a coloring agent, crystalline nucleus agent, plasticizer, fire retardant such as bromine-based fire retardant, phosphorus-based fire retardant, red phosphorus and silicone-based fire retardant, fire retardant promoter, general additive such as antistatic agent, or polymer other than thermoplastic resin.

It is preferable that the liquid crystalline polyester resin is melt-kneaded with such an additive by a known method. For example, it is melt-kneaded with a Banbury mixer, rubber roller, kneader or extruder with single screw or twin screw at 180 to 350° C., preferably 250 to 320° C., to prepare liquid crystalline polyester resin composition. It is possible to employ any one of the following methods: 1) collective kneading method to knead liquid crystalline polyester resin, optional filler and another additive; 2) master pellet method to prepare liquid crystalline resin composition (master pellet) containing a high concentration of another additive in the liquid crystalline resin and then add another thermoplastic resin, filler and another additive by a predetermined proportion; and 3) divisional adding method to knead liquid crystalline polyester resin with a part of another additive and then add a filler and the rest of another additive.

The liquid crystalline polyester resin and the liquid crystalline polyester resin composition containing thereof can be used to make a three-dimensional product, sheet, container, pipe, film or the like excellent in surface appearance (color), mechanical property, heat resistance and fire retardancy by a formation method such as general injection molding, extrusion molding and press molding. Above all, it is suitable for electric/electronic parts to be provided by injection molding.

The liquid crystalline polyester resin and the liquid crystalline polyester resin composition containing thereof are applicable to various gears, various cases, sensor, LED lamp, connector, socket, resistance, relay case, switch, coil bobbin, capacitor, variable capacitor case, optical pick-up, radiator, various terminal boards, transformer, plug, printed wiring board, tuner, speaker, microphone, headphone, small motor, magnetic head base, power module, housing, semiconductor, liquid crystal display part, FDD carriage, FDD chassis, HDD part, motor brush holder, parabolic antenna, electric/electronic parts represented by computer-related parts; VTR part, TV part, iron, hair dryer, rice cooker part, microwave oven part, acoustic part, audio equipment part such as audio, laser disc (registered trademark) and compact disk, home and office electric appliance part represented by illumination part, refrigerator part, air-conditioner part, typewriter part, and word processor part, office computer-related part, telephone-related part, facsimile-related part, copier-related part, washing jig, various bearings such as oilless bearing, stern bearing and underwater bearing, machine-related part represented by motor part, lighter and typewriter, optical device represented by microscope, binoculars, camera, and watch or clock, precision instrument-related part, alternator terminal, alternator connector, IC regulator, potentiometer base for light dimmer, various valves such as exhaust gas valve, various fuel/exhaust/intake-related pipes, car/vehicle-related parts such as air-intake nozzle snorkel, intake manifold, fuel pump, engine coolant joint, carburetor main body, carburetor spacer, exhaust gas sensor, coolant sensor, oil temperature sensor, throttle position sensor, crankshaft position sensor, air flow meter, brake pad abrasion sensor, thermostat base for air-conditioners, motor insulator for air-conditioners, separator, heating warm air flow control valve, brush holder for radiator motors, water pump impeller, turbine vane, wiper motor-related part, distributor, starter switch, starter relay, wire harness for transmissions, wind washer nozzle, air-conditioner panel switch board, coil for fuel-related electromagnetic valves, connector for fuses, horn terminal, electric equipment part insulation board, step motor rotor, lamp socket, lamp reflector, lamp housing, brake piston, solenoid bobbin, engine oil filter and ignition device case. They are useful to provide a film for magnetic recording media films, photographic films, capacitor films, electric insulator films, wrapping films, drafting films and ribbons. They are also useful to provide a sheet for car interior ceiling, door trim, pad material for instrument panels, bumper or buffer material of side frame, sound absorbing pad on the back of bonnet, seat material, pillar, fuel tank, brake hose, nozzle of wind washer liquid, tube of air-conditioner refrigerant and peripheral components thereof.

EXAMPLES

Hereinafter, our invention will be explained with Examples and Comparative Examples, which our invention is not limited to in particular.

The manufacturing method of Examples 1-15 and Comparative Examples 1-3 were carried out up to 20 times (20 batches) to perform the following evaluations (1)-(8). Besides, when the test was finished with batches less than the maximum batches, average value calculated among the finished batches was recorded.

(1) Travelling of Strand Group of Liquid Crystalline Polyester Resin

Test batches are repeated to visually observe conditions of strand group on the trough. The evaluation is determined according to the following standards A, B and C.

A: No interruption of discharge with neither fluttering nor meandering

B: No interruption of discharge even with fluttering or meandering

C: Some interruption of discharge (2) Batch Number (Batch) Blocking Die Holes with Liquid Crystalline Polyester Resin Test batches are repeated to determine the batch number at which die holes of discharge port start to be blocked.

(3) Fault Pellet Numbers [Units/50 g] of Liquid Crystalline Polyester Resin

Pellets of 50 g are sampled from each test batch to count the number of fault pellets such as slant pellet, interconnected spherical pellet and uncut pellet to calculate an average of all the test batches.

(4) Black Foreign Substance Number [Units/15 g] in Liquid Crystalline Polyester Resin Pellets The number is determined with a hot press machine made by TESTER SANGYO Co., Ltd. Pellets of 15 g are sampled from each test batch and divided equally to three portions of 5 g pellets which are pressed at temperature set at the melting point+10° C. to prepare thin discoid sheets. Thus total three thin discoid sheets are repeatedly prepared from 5 g pellets. The three sheets are visually observed to count black foreign substances having a size of 0.2 mm or more, and then an average of all the test batches are calculated from the total number of thus counted black foreign substances [pieces/15 g].

(5) Measurement of Melting Point (Tm) of Liquid Crystalline Polyester Resin

After observing endothermic peak temperature (Tm1) with a differential scanning calorimeter DSC-7 (produced by Parkin Elmer, Inc.) at temperature rising rate of 20° C./min from room temperature, the temperature is kept at Tm1+20° C. for 5 min and then cooled at temperature falling rate of 20° C./min to room temperature. The melting point is determined as endothermic peak temperature (Tm2) to be observed when the temperature is further raised at temperature rising rate of 20° C./min.

(6) Measurement of Melt Viscosity of Liquid Crystalline Polyester Resin

The melt viscosity is measured with a Koka-type flow tester CFT-500D (Olifice: 0.5φ×10 mm) (made by SHIMADZU CORPORATION) under conditions of shear rate 200 [1/sec] and shear rate 5,000 [1/sec] at each temperature of manufacture examples.

(7) Measurement of Temperature of Liquid Crystalline Polyester Resin

The temperature of liquid crystalline polyester resin being discharged is measured with a thermometer element inserted between a plate (perforated plate) having holes and a plate (discharge plate) having die holes.

(8) Measurement of Compositional Ratio of Liquid Crystalline Polyester Resin

The compositional ratio of liquid crystalline polyester resin is measured by the measurement method of $^1$H-nuclear magnetic resonance spectrum ($^1$H-NMR). Liquid crystalline polyester resin of 50 mg is dissolved with 800 μL of solvent of pentafluorophenol/1,1,2,2-tetrachloroethane-$d_2$ (mixture ratio: 65/35 [w/w %]) in a test tube for NMR to perform the $^1$H-NMR measurement at observation frequency of 500 MHz and temperature of 80° C. with UNITY INOVA 500 type NMR device (made by Varian, Inc.), so that a peak derived from each structure unit is observed around 4.5-5 ppm or 7-9.5 ppm to determine the composition according to peak area ratio.

Example 1

FIGS. 1-3 shows polycondensation reactor 1 having volume of 2,500 L comprising stirring blade 2, distillation pipe 4, distilling acetic acid container (not shown), decompresser (not shown) and discharge port at the bottom. Die head 8 connected to discharge valve 7 was attached to the bottom of polycondensation reactor 1. Perforated plate 10 having holes of 4.0 mm diameter was attached to the bottom of die head 8. Discharge port plate 11 having 40 die holes having diameter of 5.0 mm was further attached to the bottom thereof. Ratio (H1/H2) was 0.40, where H1 means height 14 from perforated plate 10 to discharge port plate 11 and H2 means height 15 of die head 8. Ratio (H2/W) was 0.20, where H2 means height 15 and W means width 26 of the bottom of die head 8. Ratio (D/W) was 0.10, where D means depth 27 of the bottom of die head 8 and W means width 26 of the bottom. The said W and D are measured as inside dimensions. In other words, W and D mean the width and depth of cavity surrounded by die head 8 inner walls illustrated with dashed lines in FIGS. 2-3.

As shown in FIG. 2, die head 8 having jacket 9 on the outer wall surface was heated with liquid heat medium circulated by a pump. Slide plate valve 13 capable of being heated with a heating wire was attached to the discharge port of die head 8.

In polycondensation reactor 1, 641 parts by mass (60 mol %) of p-hydroxybenzoic acid, 173 parts by mass (12 mol %) of 4,4'-dihydroxybiphenyl, 68 parts by mass (8 mol %) of hydroquinone, 206 parts by mass (16 mol %) of terephthalic acid, 51 parts by mass (4 mol %) of isophthalic acid, 4 parts by mass of excessive hydroquinone and 868 parts by mass (1.09 equivalents relative to total phenolic hydroxyl group) of acetic anhydride were stirred to be acetylated for 1.5 hours at 145° C. in nitrogen atmosphere.

Next, distillation pipe 4 was changed to connect the distilling acetic acid container. The acetylation reaction continued for 4 hours up to 270° C. It continued further for 2 hours up to 355° C. and then decompression was started with a decompressor for 2 hours down to 133 Pa (1 torr) to finish the polycondensation reaction when a predetermined stirring torque was reached.

Next, polycondensation reactor 1 was pressurized inside with nitrogen at 0.2 MPa. Discharge valve 7 and slide plate valve 13 of die head 8 were opened to discharge strands of polymer from discharge port plate 11 via die holes. Strand group 16 was solidified with coolant and pelletized with a cutter at take-up velocity of 31 [m/min]. The discharge was carried out for 35 min. The shear rate per 1 die hole was 693 [1/sec]. The above-described method was repeated for polymerization by 20 batches.

The strand travelling was stable without blocking die holes during the discharge. Obtained pellets 22 were good with a few fault pellets and a few black foreign substances.

The liquid crystalline polyester resin had temperature of 355° C. during the discharge at which the value of μa200/μa5000 was 3.8.

The liquid crystalline polyester resin had structure unit (I) of which proportion was 60.2 mol % and of which melting point was 332° C.

Example 2

Pellets 22 were manufactured by the same method as Example 1, except that H1/H2 was set at 0.24 and H2/W was set at 0.33. The strand travelling was stable without blocking die holes. Obtained pellets 22 had acceptable numbers of fault pellets and black foreign substances.

The liquid crystalline polyester resin had temperature of 355° C. during the discharge at which the value of μa200/μa5000 was 3.8.

Example 3

Pellets 22 were manufactured by the same method as Example 1, except that H1/H2 was set at 0.18 and H2/W was set at 0.45.

As for the strand travelling, the discharge could be continued although both ends were slightly thinner and slight fluttering was observed. Although die holes started to be blocked at the 17th batch, polymerization could be carried out by 20 batches. Obtained pellets 22 had acceptable numbers of fault pellets and black foreign substances.

The liquid crystalline polyester resin had temperature of 355° C. during the discharge at which the value of μa200/μa5000 was 3.8.

Example 4

Pellets 22 were manufactured by the same method as Example 1, except that H1/H2 was set at 0.63 and H2/W was set at 0.32.

As for the strand travelling, the discharge could be continued although the strands had uneven thicknesses as a whole and slight fluttering was observed. Although die holes started to be blocked at the 19th batch, polymerization could be carried out by 20 batches. Obtained pellets 22 had acceptable numbers of fault pellets and black foreign substances.

The liquid crystalline polyester resin had temperature of 355° C. during the discharge at which the value of μa200/μa5000 was 3.8.

Example 5

Pellets 22 were manufactured by the same method as Example 1, except that the die hole diameter of discharge port plate 11 was set at 6.0 mm and the shear rate per die hole was set at 401 [1/sec] during the discharge.

As for the strand travelling, the discharge could be continued although slight fluttering was observed. Blocking the die holes was not observed in particular. Obtained pellets 22 had acceptable numbers of few fault pellets and black foreign substances.

The liquid crystalline polyester resin had temperature of 355° C. during the discharge at which the value of μa200/μa5000 was 3.8.

Example 6

Pellets 22 were manufactured by the same method as Example 1, except that the die hole diameter of perforated plate 10 was set at 5.5 mm.

The strand travelling was stable without blocking die holes during the discharge. Obtained pellets 22 had acceptable numbers of few fault pellets and black foreign substances.

The liquid crystalline polyester resin had temperature of 355° C. during the discharge at which the value of μa200/μa5000 was 3.8.

Example 7

Pellets 22 were manufactured by the same method as Example 1, except that the die hole number of discharge port plate 11 was set at 30, that the discharge time was set at 45 min and that the shear rate per die hole was set at 719 [1/sec].

The strand travelling was stable without blocking die holes during the discharge. Obtained pellets 22 had acceptable numbers of fault pellets and black foreign substances.

The liquid crystalline polyester resin had temperature of 355° C. during the discharge at which the value of μa200/μa5000 was 3.8.

Example 8

Pellets 22 were manufactured by the same method as Example 1, except that the stirring torque for finishing the polycondensation reaction was increased by half and the value of μa200/μa5000 at 355° C. at which liquid crystalline polyester resin was discharged was 11.0. Because the strand was too thin when the discharge was started, polycondensation reactor 1 was pressurized inside with nitrogen to 0.25 MPa to regulate pellet size.

As for the strand travelling, the discharge could be continued although fluttering was observed. Although die holes started to be blocked at the 18th batch, polymerization could be carried out by 20 batches. Obtained pellets 22 had acceptable numbers of fault pellets and black foreign substances.

Example 9

The same polycondensation reactor 1 and other apparatuses as Example 1 were used.

Polycondensation reactor 1 was filled with the following components.
  p-hydroxybenzoic acid of 752 parts by mass (73 mol %)
  4,4'-dihydroxybiphenyl of 127 parts by mass (9 mol %)
  terephthalic acid of 113 parts by mass (9 mol %)
  polyethylene terephthalate of 131 parts by mass (9 mol %)
  sodium hypophosphate of 0.2 parts by mass (0.02 mass %)
  acetic anhydride of 771 parts by mass (1.11 equivalents relative to total phenolic hydroxyl group)

In polycondensation reactor 1, they were stirred to be acetylated for 1.5 hours at 145° C. in nitrogen atmosphere. Next, distillation pipe 4 was changed to connect the distilling acetic acid container. The acetylation reaction continued for 4 hours up to 270° C. It continued further for 2 hours up to 335° C. and then decompression was started with a decompressor for 2 hours down to 133 Pa (1 torr) to finish the polycondensation reaction when a predetermined stirring torque was reached.

Next, polycondensation reactor 1 was pressurized inside with nitrogen at 0.15 MPa. Discharge valve 7 and slide plate valve 13 of die head 8 were opened to discharge strands of polymer from discharge port plate 11 via die holes. Strand group 16 was solidified with coolant and pelletized with a cutter at take-up velocity of 41 [m/min]. The discharge was carried out for 35 min. The shear rate per 1 die hole was 693 [1/sec]. The above-described method was repeated for polymerization by 20 batches.

The strand travelling was stable without blocking die holes during the discharge. Obtained pellets 22 were good with a few fault pellets and a few black foreign substances.

The liquid crystalline polyester resin had temperature of 335° C. during the discharge at which the value of μa200/μa5000 was 2.9.

The liquid crystalline polyester resin had structure unit (I) of which proportion was 73.1 mol % and of which melting point was 326° C.

Example 10

Pellets 22 were manufactured by the same method as Example 1, except that a mesh filter (second perforated plate) of opening 3.0 mm was fixed above a plate (first perforated plate) having holes of diameter 4.0 mm.

The strand travelling was stable without blocking die holes during the discharge. Obtained pellets 22 were good with a few fault pellets and a few black foreign substances.

The liquid crystalline polyester resin had temperature of 355° C. during the discharge at which the value of μa200/μa5000 was 3.8.

Example 11

Pellets 22 were manufactured by the same method as Example 1, except that the D/W was set at 0.20.

As for the strand travelling, the discharge could be continued although the strands had uneven thicknesses as a whole and slight fluttering was observed. Although die holes started to be blocked at the 16th batch, polymerization could be carried out by 20 batches. Obtained pellets 22 had acceptable numbers of fault pellets and black foreign substances.

The liquid crystalline polyester resin had temperature of 355° C. during the discharge at which the value of μa200/μa5000 was 3.8.

Example 12

Pellets 22 were manufactured by the same method as Example 1, except that the discharge time was set at 60 min and the shear rate per die hole was set at 404 [1/sec].

As for the strand travelling, the discharge could be continued although slight fluttering was observed. Blocking the die holes was not observed in particular. Obtained pellets 22 had acceptable numbers of fault pellets and black foreign substances.

The liquid crystalline polyester resin had temperature of 355° C. during the discharge at which the value of μa200/μa5000 was 3.8.

Example 13

Pellets 22 were manufactured by the same method as Example 1, except that H1/H2 was set at 0.12 and H2/W was set at 0.65.

As for the strand travelling, the discharge could be continued although both ends were thinner and fluttering was observed. Although die holes started to be blocked at the 14th batch, polymerization could be carried out by 20 batches. Obtained pellets 22 had acceptable numbers of fault pellets and black foreign substances.

The liquid crystalline polyester resin had temperature of 355° C. during the discharge at which the value of μa200/μa5000 was 3.8.

Example 14

Pellets 22 were manufactured by the same method as Example 7, except that the die hole number of discharge port plate 11 was set at 18 holes and the discharge time was set at 75 min.

The strand travelling was stable. Although die holes started to be blocked at the 19th batch, polymerization could be carried out by 20 batches. Obtained pellets 22 had acceptable numbers of fault pellets and black foreign substances.

The liquid crystalline polyester resin had temperature of 355° C. during the discharge at which the value of μa200/μa5000 was 3.8.

Example 15

Pellets 22 were manufactured by the same method as Example 5, except that the die hole number of discharge port plate 11 was set at 48, that the take-up velocity of strand group 16 was set at 19 m/min, that the discharge time was set at 80 min and that the shear rate per die hole was set at 146 [1/sec].

As for the strand travelling, the discharge could be continued although fluttering was observed. Although die holes started to be blocked at the 17th batch, polymerization could be carried out by 20 batches. Obtained pellets 22 had acceptable numbers of fault pellets and black foreign substances.

The liquid crystalline polyester resin had temperature of 355° C. during the discharge at which the value of μa200/μa5000 was 3.8.

Comparative Example 1

Pellets 22 were manufactured by the same method as Example 1, except that perforated plate 10 was not installed.

As for the strand travelling, the strands had uneven thicknesses and meandering was observed. The discharge could be continued although some batches had interruption of discharge.

Die holes started to be blocked at the 10th batch, so that two of die holes were almost blocked at the 20th batch. Obtained pellets 22 were no good with many fault pellets and the most black foreign substances.

The liquid crystalline polyester resin had temperature of 355° C. during the discharge at which the value of μa200/μa5000 was 3.8.

Comparative Example 2

Pellets 22 were manufactured by the same method as Example 1, except that the die hole diameter of discharge port plate 11 was set at 8.0 mm and the shear rate per die hole was set at 169 [1/sec] during the discharge.

As for the strand travelling, because great fluttering was observed and the strand stayed on trough 18 to cause flow failure, interruption and restart of discharge were repeated. However the discharge couldn't be continued and the test was stopped at the 1st batch.

Obtained pellets 22 couldn't have a regular pellet shape but irregular pellet shape such as whisker, interconnected sphere and slant for almost all although too many blocked die holes and too many black foreign substance were not observed in particular.

The liquid crystalline polyester resin had temperature of 355° C. during the discharge at which the value of μa200/μa5000 was 3.8.

Comparative Example 3

Pellets 22 were manufactured by the same method as Example 1, except that the die hole diameter of perforated plate 10 was set at 8.0 mm.

As for the strand travelling, fluttering was observed and the strands had uneven thicknesses. Die holes started to be blocked at the 13th batch, so that a die hole was almost blocked at the 20th batch. And then, the discharge was interrupted because thread-like strands started to wind around strand group take-up roll 20. Because the winding was repeated, interruption and restart of discharge were repeated. Obtained pellets 22 were no good with many fault pellets and black foreign substances.

The liquid crystalline polyester resin had temperature of 355° C. during the discharge at which the value of μa200/μa5000 was 3.8.

TABLE 1

| | Example 1 | Example 2 | Example 3 | Example 4 | Example 5 | Example 6 | Example 7 | Example 8 | Example 9 |
|---|---|---|---|---|---|---|---|---|---|
| Number and shape of perforated plate | One plate | One plate | One plate | One plate | One plate | One plate | One plate | One plate | One plate |
| Height ratio (H1/H2) | 0.40 | 0.24 | 0.18 | 0.83 | 0.40 | 0.40 | 0.40 | 0.40 | 0.40 |
| Height H2/bottom width W of die head | 0.20 | 0.33 | 0.45 | 0.32 | 0.20 | 0.20 | 0.20 | 0.20 | 0.20 |

TABLE 1-continued

|  | Example 1 | Example 2 | Example 3 | Example 4 | Example 5 | Example 6 | Example 7 | Example 8 | Example 9 |
|---|---|---|---|---|---|---|---|---|---|
| Bottom depth D/Bottom width W of die head | 0.10 | 0.10 | 0.10 | 0.10 | 0.10 | 0.10 | 0.10 | 0.10 | 0.10 |
| Die hole number [unit] of discharge port | 40 | 40 | 40 | 40 | 40 | 40 | 30 | 40 | 40 |
| Die hole diameter [mm] of discharge port | 5.0 | 5.0 | 5.0 | 5.0 | 6.0 | 5.0 | 5.0 | 5.0 | 5.0 |
| Perforated plate hole diameter/die hole diameter of discharge port | 0.8 | 0.8 | 0.8 | 0.8 | 0.7 | 1.1 | 0.8 | 0.8 | 0.8 |
| μa 200/μa 5000 | 3.8 | 3.8 | 3.8 | 3.8 | 3.8 | 3.8 | 3.8 | 11.0 | 2.9 |
| Melt viscosity [Pa · s] during discharge | 20.0 | 20.0 | 20.0 | 20.0 | 20.0 | 20.0 | 20.0 | 20.0 | 13.0 |
| Discharge time [min] | 35 | 35 | 35 | 35 | 35 | 35 | 45 | 35 | 35 |
| Shear rate [1/sec] per die hole | 693 | 693 | 693 | 693 | 401 | 693 | 719 | 693 | 693 |
| Strand take-up velocity [m/min] | 31 | 31 | 31 | 31 | 31 | 31 | 31 | 31 | 41 |
| Strand travelling | A | A | B | B | B | A | A | B | A |
| Die hole blocking batch [batch No.] | none | none | 17 | 19 | none | none | none | 18 | none |
| Fault pellet number [unit/50 g] | 6 | 12 | 25 | 30 | 35 | 14 | 16 | 38 | 5 |
| Black foreign substance number of pellet [unit/15 g] | 4 | 9 | 17 | 14 | 7 | 10 | 12 | 15 | 2 |

TABLE 2

|  | Example 10 | Example 11 | Example 12 | Example 13 | Example 14 | Example 15 | Comparative Example 1 | Comparative Example 2 | Comparative Example 3 |
|---|---|---|---|---|---|---|---|---|---|
| Number and shape of perforated plate | One filter/One plate | One plate | One plate | One plate | One plate | One plate | none | One plate | One plate |
| Height ratio (H1/H2) | 0.40 | 0.40 | 0.40 | 0.12 | 0.40 | 0.40 | — | 0.40 | 0.40 |
| Height H2/bottom width W of die head | 0.20 | 0.20 | 0.20 | 0.65 | 0.20 | 0.20 | 0.20 | 0.20 | 0.20 |
| Bottom depth D/Bottom width W of die head | 0.10 | 0.20 | 0.10 | 0.10 | 0.10 | 0.10 | 0.10 | 0.10 | 0.10 |
| Die hole number [unit] of discharge port | 40 | 40 | 40 | 40 | 18 | 48 | 40 | 40 | 40 |
| Die hole diameter [mm] of discharge port | 5.0 | 5.0 | 5.0 | 5.0 | 5.0 | 6.0 | 5.0 | 8.0 | 5.0 |
| Perforated plate hole diameter/die hole diameter of discharge port | 0.6 | 0.8 | 0.8 | 0.8 | 0.8 | 0.7 | — | 0.5 | 1.6 |
| μa 200/μa 5000 | 3.8 | 3.8 | 3.8 | 3.8 | 3.8 | 3.8 | 3.8 | 3.8 | 3.8 |
| Melt viscosity [Pa · s] during discharge | 20.0 | 20.0 | 20.0 | 20.0 | 20.0 | 20.0 | 20.0 | 20.0 | 20.0 |
| Discharge time [min] | 35 | 35 | 60 | 35 | 75 | 80 | 35 | 35 | 35 |
| Shear rate [1/sec] per die hole | 693 | 693 | 404 | 693 | 719 | 146 | 693 | 169 | 693 |
| Strand take-up velocity [m/min] | 31 | 31 | 31 | 31 | 31 | 19 | 31 | 31 | 31 |
| Strand travelling | A | B | B | B | A | B | C | C | C |
| Die hole blocking batch [batch No.] | none | 16 | none | 14 | 19 | 17 | 10 | none (Shipped at 1st Batch) | 13 |
| Fault pellet number [unit/50 g] | 6 | 28 | 34 | 52 | 21 | 46 | 245 | (Almost all) | 89 |
| Black foreign substance number of pellet [unit/15 g] | 3 | 20 | 11 | 25 | 18 | 23 | 31 | 0 (Shipped at 1st Batch) | 26 |

INDUSTRIAL APPLICATIONS OF THE INVENTION

Our manufacturing apparatus for liquid crystalline polyester resin pellets and manufacturing method thereof are flexibly applicable to manufacturing materials forming electric/electronic precision parts.

EXPLANATION OF SYMBOLS

1: polycondensation reactor
2: stirring blade
3: rectifying column
4: distillation pipe
5: nitrogen supply line
6,9: jacket
7,25: discharge valve
8,28: die head
10: perforated plate
11: discharge port plate
12: thermometer element
13: slide plate valve
14: height (H1) from perforated plate to discharge port
15: height (H2) of die head
16: strand group
17: cutter coolant supply line
18: trough
19: strand group cooling spray
20: strand group take-up roll
21: strand group cutting rotary blade
22: pellet
23: cutter part
26: width (W) of die head bottom
27: depth (D) of die head bottom

The invention claimed is:

1. A manufacturing apparatus for liquid crystalline polyester resin pellets comprising a die head provided with a discharge port for discharging a melted liquid crystalline polyester resin supplied to the die head from a reactor through a valve, a cutter for cutting the liquid crystalline polyester resin discharged from the die head and solidified, and at least one perforated plate located downstream of the valve and upstream of the discharge port, characterized in that the discharge port has a plurality of die holes of which diameters are 3 mm to 6 mm and the perforated plate has an average hole diameter of 0.1 to 1.2 times the diameter of the die holes.

2. The manufacturing apparatus according to claim 1, wherein the diameters of the die holes are 3.5 mm to 6.0 mm.

3. The manufacturing apparatus according to claim 1, wherein the die head has a flow path shaped such that a ratio of height (H2) to a bottom width (W) is 0.10 to 0.50 in a part getting wider toward the discharge port.

4. The manufacturing apparatus according to claim 1, wherein a ratio of height (H1) to height (H2) of the die head is 0.2 to 0.6, where the height (H1) is a distance between the uppermost perforated plate and the discharge port.

5. The manufacturing apparatus according to claim 1, wherein the die head has a flow path shaped such that a ratio of a bottom depth (D) to a bottom width (W) is 0.03 to 0.5 in a part getting wider toward the discharge port.

6. The manufacturing apparatus according to claim 1, wherein the discharge port has die holes of 20 or more.

7. A manufacturing method of liquid crystalline polyester resin pellets comprising:
supplying a melted liquid crystalline polyester resin through a valve from a reactor to a die head;
preparing pellets by cutting a strand group of the liquid crystalline polyester resin solidified and discharged through a discharge port from the die head; and
using the manufacturing apparatus according to claim 1.

8. The manufacturing method according to claim 7, wherein the liquid crystalline polyester resin has a melt viscosity ($\mu a200$) at shear rate of 200 [1/sec] and a melt viscosity ($\mu a5000$) at shear rate of 5,000 [1/sec] satisfying the following formula when the liquid crystalline polyester resin is discharged from the die head:

$$1.5 < (\mu a200)/(\mu a5000) < 10.0.$$

9. The manufacturing method according to claim 7, wherein the die head has a shear rate of the liquid crystalline polyester resin per die hole of the discharge port of 150 [1/sec] to 3,000 [1/sec] when the liquid crystalline polyester resin is discharged from the die head.

10. The manufacturing method according to claim 7, wherein the strand group is taken up at a take-up velocity of 20 [m/min] to 100 [m/min].

11. A manufacturing apparatus for liquid crystalline polyester resin pellets comprising a die head provided with a discharge port for discharging a melted liquid crystalline polyester resin supplied to the die head from a reactor through a valve, a cutter for cutting the liquid crystalline polyester resin discharged from the die head and solidified, and at least one perforated plate located downstream of the valve and upstream of the discharge port, characterized in that the discharge port has a plurality of die holes of which diameters are 3 mm to 6 mm and the perforated plate has an average hole diameter of 0.1 to 1.2 times the diameter of the die holes,
wherein the die head has a flow path shaped such that a ratio of height (H2) to a bottom width (W) is 0.10 to 0.50 in a part getting wider toward the discharge port,
wherein a ratio of height (H1) to height (H2) of the die head is 0.2 to 0.6, where the height (H1) is a distance between the uppermost perforated plate and the discharge port.

\* \* \* \* \*